US011752829B2

United States Patent
Ebato et al.

(10) Patent No.: US 11,752,829 B2
(45) Date of Patent: Sep. 12, 2023

(54) RADIATOR

(71) Applicant: HONDA MOTOR CO., LTD., Tokyo (JP)

(72) Inventors: Kaori Ebato, Tokyo (JP); Makoto Hotozuka, Tokyo (JP); Takayuki Abe, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 213 days.

(21) Appl. No.: 17/192,172

(22) Filed: Mar. 4, 2021

(65) Prior Publication Data

US 2021/0300148 A1 Sep. 30, 2021

(30) Foreign Application Priority Data

Mar. 30, 2020 (JP) ................................ 2020-060706

(51) Int. Cl.
*B60H 1/00* (2006.01)
*F28D 1/047* (2006.01)
*B60K 11/04* (2006.01)
*B62J 41/00* (2020.01)
(Continued)

(52) U.S. Cl.
CPC .......... *B60H 1/00328* (2013.01); *B60K 11/04* (2013.01); *B62J 41/00* (2020.02); *F28D 1/0476* (2013.01); *B60Y 2200/12* (2013.01); *B62M 7/04* (2013.01); *F28D 2021/0091* (2013.01); *F28D 2021/0092* (2013.01)

(58) Field of Classification Search
CPC ................ B60H 1/00328; B60K 11/04; B60Y 2200/12; B62J 41/00; B62M 7/04; F28D 1/0476; F28D 2021/0091; F28D 2021/0092; F28D 1/024
See application file for complete search history.

(56) References Cited

U.S. PATENT DOCUMENTS 1,872,785 A * 8/1932 Modine ................... F28D 1/024
165/125
1,979,191 A * 10/1934 Burney .................. B60K 11/04
123/41.1
(Continued)

FOREIGN PATENT DOCUMENTS

| CN | 102840780 A | 12/2012 | |
|---|---|---|---|
| CN | 103155381 B * | 4/2016 | ............... B60K 1/00 |

(Continued)

OTHER PUBLICATIONS

German Office Action with English Translation dated May 25, 2022, 7 pages.
(Continued)

*Primary Examiner* — Ljiljana V. Ciric
(74) *Attorney, Agent, or Firm* — Rankin, Hill & Clark LLP (57) ABSTRACT

A radiator includes an upper tank and a lower tank for storing cooling water, and a core for connecting the upper tank and the lower tank to each other. The core includes a plurality of cooling water pipes for flowing the cooling water between the upper tank and the lower tank, and a plurality of fins that extend between the plurality of cooling water pipes to promote heat dissipation from the cooling water pipes. The core further includes a flow surface through which air can flow, the flow surface including a recess.

9 Claims, 6 Drawing Sheets

(51) Int. Cl.
    *F28D 21/00*      (2006.01)
    *B62M 7/04*      (2006.01)

(56) References Cited

U.S. PATENT DOCUMENTS

| | | | | |
|---|---|---|---|---|
| 2,756,832 | A * | 7/1956 | Dalrymple | B62M 7/12 180/205.5 |
| 2,781,859 | A * | 2/1957 | Warren | F01P 11/08 123/196 AB |
| 3,981,354 | A * | 9/1976 | Haberski | F28F 1/26 165/181 |
| 4,019,595 | A * | 4/1977 | Imai | B62J 17/10 165/51 |
| 4,171,729 | A * | 10/1979 | Shibata | B60K 11/04 165/41 |
| 4,295,964 | A * | 10/1981 | Preisler | B01D 35/18 210/186 |
| 4,296,805 | A * | 10/1981 | Fleury | F28D 1/0535 180/53.7 |
| 4,428,451 | A * | 1/1984 | Yamaoka | F02B 75/16 165/41 |
| 4,443,921 | A * | 4/1984 | Allemandou | B21D 53/027 228/183 |
| 4,516,630 | A * | 5/1985 | Yamaguchi | F28D 1/0417 165/172 |
| 4,589,512 | A * | 5/1986 | Yamaguchi | F28D 1/0471 165/41 |
| 4,632,206 | A * | 12/1986 | Morinaka | B62J 17/02 165/41 |
| 4,640,341 | A * | 2/1987 | Ozawa | B60K 11/04 165/41 |
| 4,660,624 | A * | 4/1987 | Yamaguchi | F28D 1/05383 165/41 |
| 4,673,032 | A * | 6/1987 | Hara | F28D 1/05366 165/44 |
| 4,709,774 | A * | 12/1987 | Saito | B62J 17/02 180/68.1 |
| 4,876,778 | A * | 10/1989 | Hagihara | B21D 53/085 29/428 |
| 4,953,631 | A * | 9/1990 | Kimura | F02B 61/02 165/44 |
| 5,046,550 | A * | 9/1991 | Boll | B60K 11/04 123/41.31 |
| 5,244,036 | A * | 9/1993 | Michl | B62M 7/02 165/44 |
| 5,279,360 | A * | 1/1994 | Hughes | F28D 1/0478 29/890.07 |
| 5,341,870 | A * | 8/1994 | Hughes | F28F 3/025 165/110 |
| 5,566,746 | A * | 10/1996 | Reise | F02B 61/02 165/44 |
| 5,901,808 | A * | 5/1999 | Swenson | B62J 11/00 180/68.4 |
| 5,984,035 | A * | 11/1999 | Katoh | B62J 23/00 180/68.1 |
| 5,992,554 | A * | 11/1999 | Hasumi | F02B 61/02 123/41.51 |
| 6,332,505 | B1 * | 12/2001 | Tateshima | F02B 61/02 180/68.4 |
| 7,159,682 | B2 * | 1/2007 | Arnold | B62K 19/30 180/68.4 |
| 7,188,696 | B2 * | 3/2007 | Arnold | B62K 11/04 180/68.1 |
| 7,404,463 | B2 * | 7/2008 | Saiki | B62K 11/04 180/68.4 |
| 7,445,070 | B1 * | 11/2008 | Pickering | B62D 61/08 180/215 |
| 7,448,461 | B2 * | 11/2008 | Misaki | B62J 17/02 180/68.1 |
| 7,987,936 | B2 * | 8/2011 | Yamakura | F01P 11/10 180/68.1 |
| 7,987,938 | B2 * | 8/2011 | Morita | B62K 11/04 180/68.6 |
| 8,955,629 | B2 * | 2/2015 | Toda | F28D 1/0443 180/68.4 |
| 8,967,090 | B2 * | 3/2015 | Inoue | F28D 1/05366 123/41.1 |
| 9,004,211 | B2 * | 4/2015 | Nakamura | B62K 11/10 180/68.4 |
| 9,061,727 | B2 * | 6/2015 | Iijima | B62K 11/04 |
| 9,160,214 | B2 * | 10/2015 | Matsuda | B60K 1/04 |
| 9,459,051 | B2 * | 10/2016 | Clarke | F28D 1/04 |
| 9,751,393 | B2 * | 9/2017 | Nakata | B60K 13/04 |
| 10,124,662 | B2 * | 11/2018 | Jyouzaki | B60K 11/04 |
| 10,378,420 | B2 * | 8/2019 | Kisaichi | B62K 11/04 |
| 2007/0045025 | A1 * | 3/2007 | Hasegawa | B62K 11/04 180/228 |
| 2010/0187033 | A1 * | 7/2010 | Hayashi | B62K 19/30 180/68.4 |
| 2013/0118721 | A1 * | 5/2013 | Inoue | F28D 1/05366 165/148 |
| 2013/0168039 | A1 * | 7/2013 | Arai | B62M 7/02 165/41 |
| 2013/0233258 | A1 * | 9/2013 | Dees | F02F 1/40 123/41.79 |
| 2014/0034267 | A1 * | 2/2014 | Hojo | B62J 23/00 165/51 |
| 2015/0068830 | A1 * | 3/2015 | Nakata | B60K 13/04 180/229 |
| 2015/0328979 | A1 * | 11/2015 | Matsuo | B60K 11/04 180/68.1 |
| 2016/0229283 | A1 * | 8/2016 | Laroche | B62D 25/085 |

FOREIGN PATENT DOCUMENTS

| | | | | |
|---|---|---|---|---|
| DE | 19649711 | A1 * | 6/1998 | B60K 11/04 |
| DE | 19649711 | C2 * | 1/2000 | B60K 11/04 |
| DE | 202013105753 | U1 * | 6/2014 | B60K 11/04 |
| EP | 0036213 | A1 | 9/1981 | |
| EP | 2639941 | A1 * | 9/2013 | B60K 1/00 |
| EP | 2631447 | B1 * | 10/2014 | F01P 3/18 |
| JP | S56-136973 | U | 10/1981 | |
| JP | S56-173878 | U | 12/1981 | |
| JP | S57-145173 | U | 9/1982 | |
| JP | 62-178481 | A | 8/1987 | |
| JP | 2001-355975 | A | 12/2001 | |
| JP | 2002-106345 | A | 4/2002 | |
| JP | 2013173473 | A * | 9/2013 | F01P 3/18 |
| JP | 5451287 | | 1/2014 | |
| JP | 5816534 | B2 * | 11/2015 | F01P 3/18 |
| WO | 2013/095424 | A1 | 6/2013 | |

OTHER PUBLICATIONS

Japanese Office Action from corresponding Japanese application 2020060706.A dated May 30, 2023, 9 pages.

* cited by examiner

RADIATOR

INCORPORATION BY REFERENCE

The present application claims priority under 35 U.S.C. § 119 to Japanese Patent Application No. 2020-060706 filed on Mar. 30, 2020. The content of the application is incorporated herein by reference in its entirety.

BACKGROUND

Technical Field

The present invention relates to a radiator.

Related Art

Conventionally, a radiator has been known in which a cooling fan for performing forced cooling is disposed at the rear (see, for example, JP 5451287 B2).

SUMMARY

In JP 5451287 B2, since the radiator and the cooling fan are disposed at the front and rear, a large space is required in the front-rear direction. A more compact arrangement of vehicle components and a radiator is desired.

It is an object of the present invention to provide a radiator that can be disposed more compactly together with vehicle components.

A radiator includes: a first tank (73) and a second tank (74) configured to store cooling water; and a core (75) configured to connect the first tank (73) and the second tank (74) to each other, the core (75) including a plurality of cooling water pipes (83a to 83e) configured to flow the cooling water between the first tank (73) and the second tank (74), and a plurality of fins (84a to 84d) configured to be extended between the plurality of cooling water pipes (83a to 83e) and promote heat dissipation from the cooling water pipes, in which a recess (47b) is provided at least on a flow surface (73a) which is provided to the core (75) and where air flows.

With the above configuration, the radiator may be disposed behind a front wheel (12) of a vehicle (10) and upper and lower portions of the radiator may have different thicknesses in a front-rear direction of the vehicle.

With the above configuration, the core (75) may be disposed to extend to outside of the first tank (73) and the second tank (74) in a direction perpendicular to a traveling direction of the vehicle (10).

With the above configuration, the first tank (73) and the second tank (74) may include protrusions (73N and 74N) extending toward a space between the first tank (73) and the second tank (74).

With the above configuration, the cooling water pipes (83a to 83e) may be formed in an arc shape and connected to the first tank (73) and the second tank (74).

With the above configuration, the fins (84a to 84d) may be provided horizontally along a vehicle traveling direction.

With the above configuration, at least a part of the first tank (73) and the second tank (74) may be formed in a fan shape.

Since the radiator includes a recess at least on a flow surface which is provided to the core and where air flows, vehicle components such as a cooling fan can be disposed in the recess, and the radiator can be disposed in a compact manner.

With the above configuration, the radiator is disposed behind the front wheel of the vehicle, and the upper and lower portions of the radiator have different thicknesses in the front-rear direction of the vehicle, so that the radiator can be shaped along the shape of a vehicle body cover provided on the vehicle, and the appearance can be improved and the radiator can be disposed in a compact manner.

With the above configuration, the core is disposed to extend to outside of the first tank and the second tank in a direction perpendicular to a traveling direction of the vehicle, so that the coolability of the core can be increased.

With the above configuration, the first tank and the second tank include protrusions extending toward the space between the first tank and the second tank, so that the cooling water pipes can be easily connected to both side faces of the protrusions.

With the above configuration, the cooling water pipes are formed in an arc shape and connected to the first tank and the second tank, so that the flow of the cooling water in the cooling water pipes can be made smooth. Those disposed on an outer side among the cooling water pipes having an arc shape can have a longer pipe length, enabling an increase in coolability.

With the above configuration, the fins are provided horizontally along the vehicle traveling direction, so that air resistance can be reduced when the radiator is mounted on the vehicle.

With the above structure, at least a part of the first tank and the second tank is formed in a fan shape, so that water can be easily sent from the first tank and the second tank to the core. The ends of the cooling water pipes having an arc shape can be easily connected.

DETAILED DESCRIPTION

An embodiment of the present invention will be described below with reference to the drawings. In the description, directions such as front, rear, left, right, up, and down are the same as the directions with respect to a vehicle body unless otherwise specified. In each of the drawings, reference symbol FR denotes a front portion of the vehicle body, reference symbol UP denotes an upper portion of the vehicle body, and reference symbol LH denotes a left portion of the vehicle body.

Figure 1:
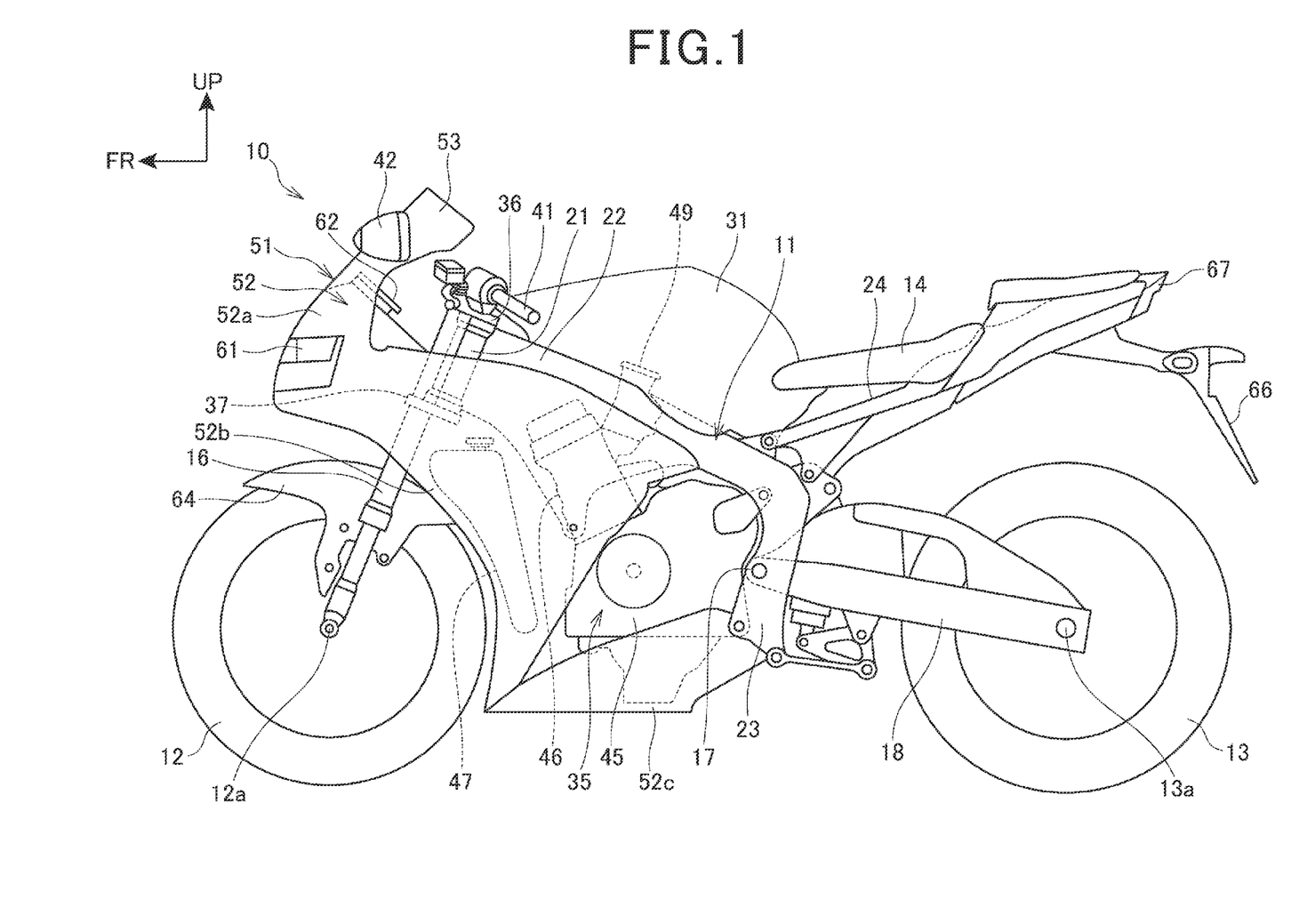
FIG. 1 is a left side view illustrating a motorcycle according to an embodiment of the present invention.
Figure 2:
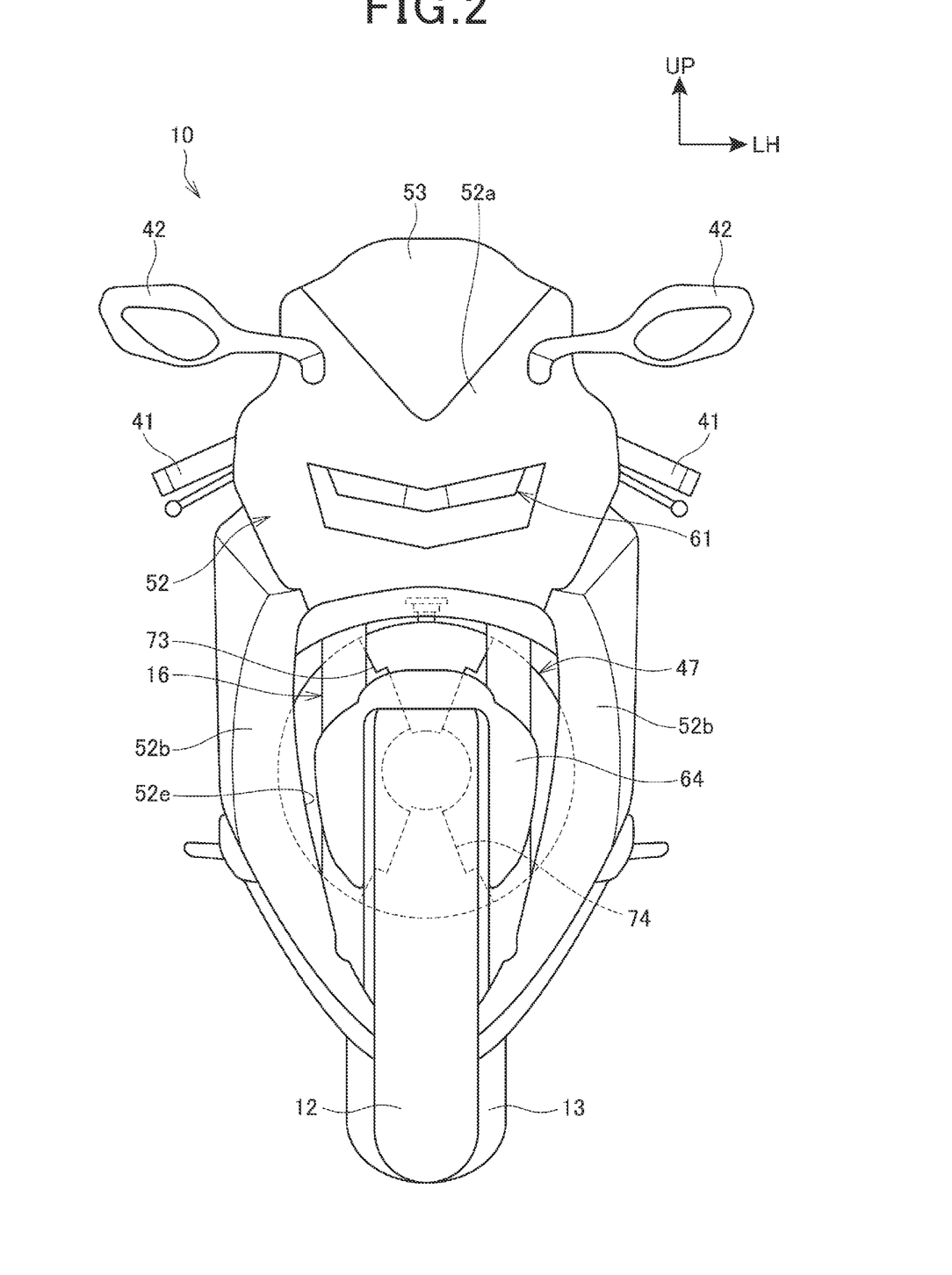
FIG. 2 is a front view illustrating a motorcycle.

FIG. 1 is a left side view illustrating a motorcycle 10 according to an embodiment of the present invention, and FIG. 2 is a front view illustrating the motorcycle 10.

As illustrated in FIG. 1, the motorcycle 10 is a saddle riding type vehicle including a vehicle body frame 11, a front wheel 12, a rear wheel 13, and a seat 14.

The vehicle body frame 11 includes a head pipe 21, a pair of right and left main frames 22, a pair of right and left pivot frames 23, and a pair of right and left seat frames 24.

The head pipe 21 constitutes a front end portion of the vehicle body frame 11, and supports a front fork 16 that supports the front wheel 12 so as to be steerable. The main frames 22 extend obliquely backward and downward from the head pipe 21 and supports an engine 35. On an upper portion of the main frames 22, a fuel tank 31 is supported.

The pivot frames 23 extend downward from a rear end portion of the main frames 22 and supports a pivot shaft 17 extending in a vehicle width direction. The pivot frames 23 cooperates with the main frames 22 to support the engine 35. The seat frames 24 extend obliquely backward and upward from the rear end portion of the main frames 22 and an upper end portion of the pivot frames 23, and support the seat 14.

The front fork 16 includes a top bridge 36 and a bottom bridge 37 for connecting its right and left sides. On an upper surface of the top bridge 36, a pair of right and left bar handles 41 are mounted, and on a lower end portion of the front fork 16, the front wheel 12 is supported via an axle 12a.

On the pivot shaft 17, a swing arm 18 is mounted so as to be swingable up and down, and the rear wheel 13 is supported on a rear end portion of the swing arm 18 via an axle 13a.

The engine 35 includes a crankcase 45 and a cylinder portion 46 extending diagonally forward and upward from a front portion of the crankcase 45. In front of the cylinder portion 46, a radiator 47 cooling the engine 35 with water is disposed. To a rear portion of the cylinder portion 46, an intake device 49 including an air cleaner or the like is connected.

The vehicle body frame 11 is covered with a vehicle body cover 51.

The vehicle body cover 51 includes a cowl 52. The cowl 52 includes an upper cowl 52a for covering the head pipe 21 and an upper portion of the front fork 16, a pair of right and left middle cowls 52b extending rearward from the upper cowl 52a and covering the cylinder portion 46 of the engine 35 from the side, and a pair of right and left lower cowls 52c for covering a lower portion of the engine 35 from the side.

Inside the upper cowl 52a, a headlight 61 is disposed. On an upper portion of the upper cowl 52a, a windscreen 53 and a pair of right and left rearview mirrors 42 are mounted. On an upper portion of the upper cowl 52a and behind the windscreen 53, a meter unit 62 is disposed.

The front wheel 12 is covered with a front fender 64 from above. The rear wheel 13 is covered with a rear fender 66 from above. Above the rear fender 66, a tail light 67 is disposed.

As illustrated in FIG. 2, the radiator 47 has a contour formed in a circular shape in front view, is disposed behind the front fork 16 and the front fender 64, and is partially visible through a front opening 52e formed by the upper cowl 52a and the right and left middle cowls 52b.

Since the radiator 47 has no corner as compared with the conventional radiator, it can be disposed along the curved shape of the cowl 52, so that the radiator capacity can be easily secured in the vehicle body and the degree of freedom of arrangement in the vehicle body can be increased.

Figure 3:
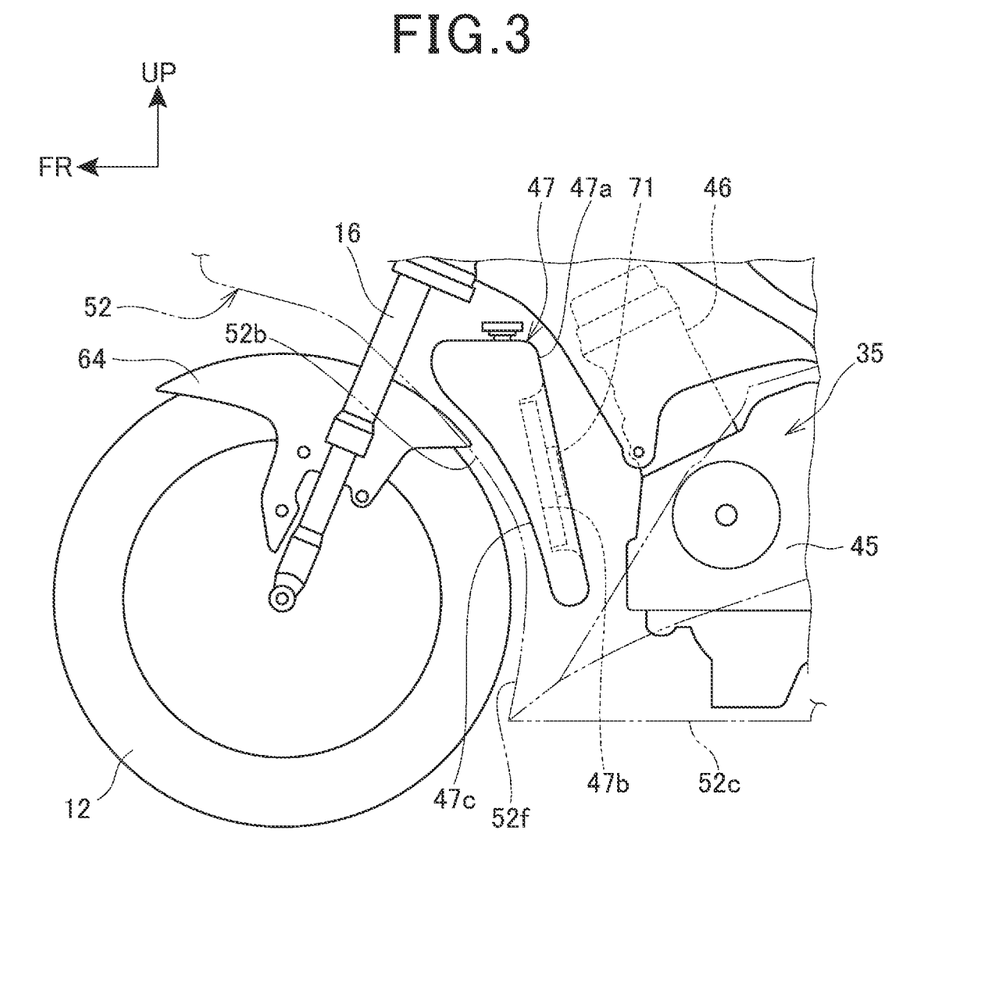
FIG. 3 is a left side view illustrating a radiator and its surroundings.

FIG. 3 is a left side view illustrating the radiator 47 and its surroundings with the cowl 52 removed. The main shape of the cowl 52 is indicated by the two-dot chain line.

The radiator 47 is disposed behind the front wheel 12, a recess 47b is formed in a back surface 47a of the radiator 47, and a cooling fan 71 for forcibly cooling the radiator 47 is disposed in the recess 47b.

The back surface 47a of the radiator 47 tilts forward or extends vertically and flatly or substantially flatly.

A front surface 47c of the radiator 47 is shaped to gradually expand forward as it extends upward from its lower portion. That is, an upper portion of the radiator 47 is formed thicker than a lower portion in the front-rear direction. Thus, even when the recess 47b is formed on the back surface 47a, the capacity of the radiator 47 can be secured.

The front surface 47c is shaped along the cowl 52, more specifically, a front edge 52f of the middle cowl 52b in a side view of the vehicle.

Thus, by shaping the front surface 47c of the radiator 47 along the middle cowl 52b, the radiator 47 can be hardly exposed in a side view of the vehicle, and the appearance can be improved.

The back surface 47a may be tilted backward and the front surface 47c may be shaped along the front edge 52f of the middle cowl 52b. Thus, the thickness of the upper portion of the radiator 47 in the front-rear direction can be increased, and in a vehicle having the engine 35 with a large displacement, the capacity of the radiator 47 can be easily secured.

Figure 4:
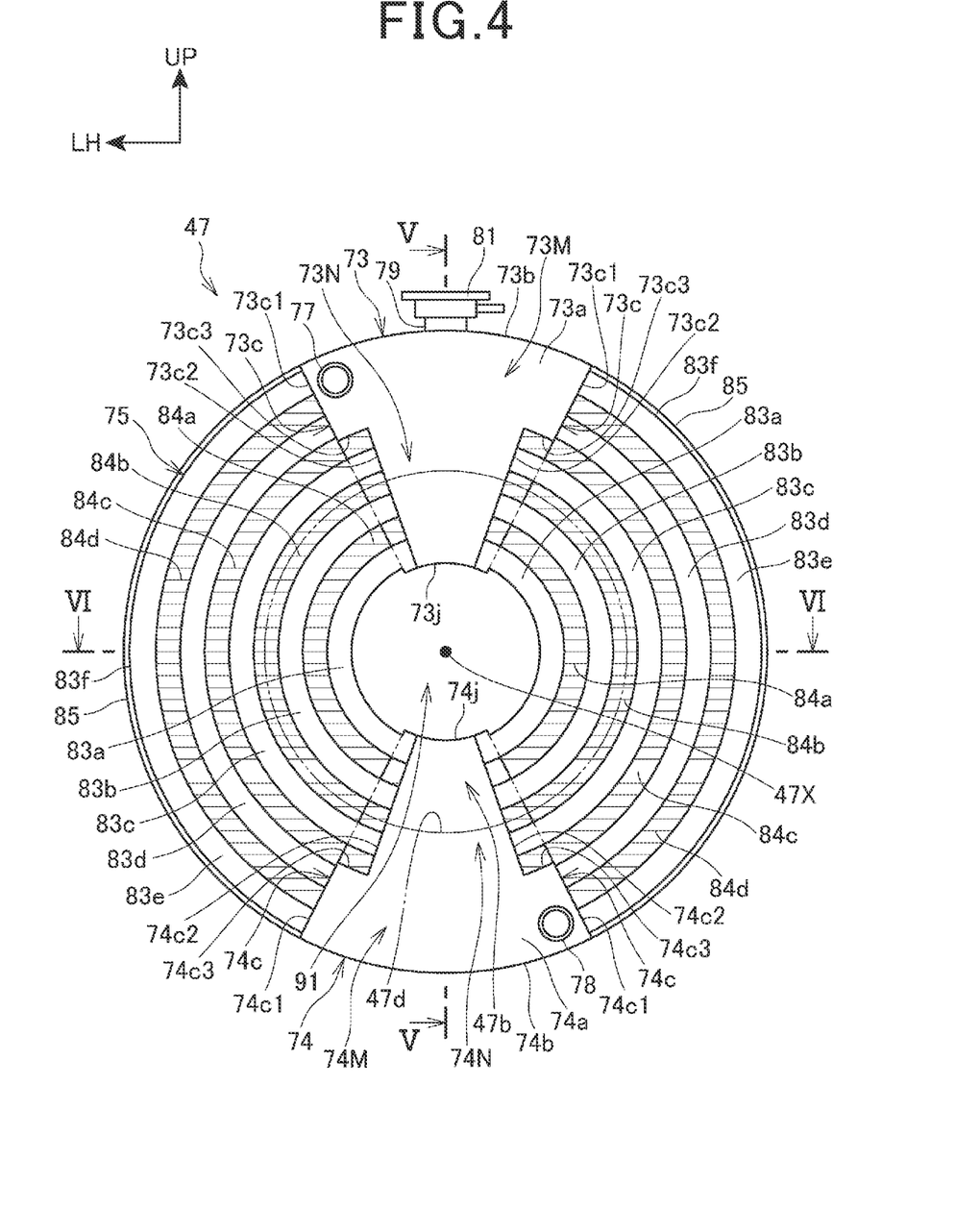
FIG. 4 is a rear view illustrating a radiator.

FIG. 4 is a rear view illustrating the radiator 47.

The radiator 47 includes an upper tank 73, which is a first tank, and a lower tank 74, which is a second tank, disposed respectively at an upper portion and a lower portion, and a core 75 connecting the upper tank 73 and the lower tank 74.

The upper tank 73 and the lower tank 74 are portions for storing cooling water, and a cooling water intake port 77 is provided near an outer circumference of a back surface 73a of the upper tank 73, and a cooling water discharge port 78 is provided near the outer circumference portion of a back surface 74a of the lower tank 74. An outer circumference surface 73b of the upper tank 73 is provided with a water injection port 79, and the water injection port 79 is closed by a cap 81, which is detachable.

The upper tank 73 is formed in a fan shape as viewed from the back, and integrally includes a tank outer circumferential portion 73M provided radially outside and a tank inner circumferential portion 73N, which is a protrusion provided radially inside of the tank outer circumferential portion 73M. The tank outer circumferential portion 73M and the tank inner circumferential portion 73N are formed in a fan shape as viewed from the back, and the tank inner circumferential portion 73N protrudes radially inward from the tank outer circumferential portion 73M.

Each of side faces 73c on both sides of the tank outer circumferential portion 73M includes a side face 73c1 of the tank outer circumferential portion 73M, a side face 73c2 of the tank inner circumferential portion 73N, and a connection face 73c3 having an arc shape connecting the side faces 73c1 and 73c2.

The side faces 73c1 and 73c2 are disposed so as to overlap a straight line extending radially from a center 47X (the center 47X is also the center of the core 75) of the radiator 47. An inner circumference surface 73j of the tank inner circumferential portion 73N is formed in an arc shape connecting inner ends of the pair of side faces 73c2 as viewed from the back.

Similar to the upper tank 73, the lower tank 74 is formed in a fan shape as viewed from the back, and integrally includes a tank outer circumferential portion 74M provided radially outside and a tank inner circumferential portion 74N, which is a protrusion provided radially inside of the tank outer circumferential portion 74M. The tank outer circumferential portion 74M and the tank inner circumferential portion 74N are formed in a fan shape as viewed from the back, and the tank inner circumferential portion 74N protrudes radially inward from the tank outer circumferential portion 74M.

Here, the tank inner circumferential portion 73N and the tank inner circumferential portion 74N extend toward a center portion (i.e., the center 47X) of the core 75, but the present invention is not limited thereto. In other words, it is sufficient if the tank inner circumferential portion 73N and the tank inner circumferential portion 74N extend toward the space between the tank inner circumferential portion 73N and the tank inner circumferential portion 74N.

Each of side faces 74c on both sides of the tank outer circumferential portion 74M includes a side face 74c1 of the tank outer circumferential portion 74M, a side face 74c2 of the tank inner circumferential portion 74N, and a connection face 74c3 having an arc shape connecting the side faces 74c1 and 74c2.

The side faces 74c1 and 74c2 are disposed so as to overlap a straight line extending radially from the center 47X. An inner circumference surface 74j of the tank inner circumferential portion 74N is formed in an arc shape connecting inner ends of the pair of side faces 74c2 as viewed from the back.

The core 75 includes a plurality of cooling water pipes 83a, 83b, 83c, 83d, and 83e (hereinafter, the "cooling water pipes 83a, 83b, 83c, 83d, and 83e" are referred to as "cooling water pipes 83a to 83e") having an arc shape that are concentrically disposed between the upper tank 73 and the lower tank 74 with both ends connected to the upper tank 73 and the lower tank 74, and a plurality of fins 84a, 84b, 84c, and 84d (hereinafter, the "fins 84a, 84b, 84c, and 84d" are referred to as "fins 84a to 84d") having a flat plate shape with both ends attached to the adjacent cooling water pipes 83a to 83e.

The back surface 73a of the core 75 is a flow surface where air passing through the inside of the core 75 flows out, i.e., air flows.

The recess 47b is formed over the upper tank 73, the lower tank 74, and the core 75.

The cooling water pipes 83a and 83b are disposed radially inside of the inner circumference surface 47d of the recess 47b, and the cooling water pipes 83c, 83d and 83e are disposed radially outside of the inner circumference surface 47d.

The plurality of fins 84a are disposed between the cooling water pipes 83a and 83b, the plurality of fins 84b are disposed between the cooling water pipes 83b and 83c, the plurality of fins 84c are disposed between the cooling water pipes 83c and 83d, and the plurality of fins 84d are disposed between the cooling water pipes 83d and 83e.

The right and left cooling water pipes 83b to 83e and the plurality of fins 84b to 84d are disposed outside of the upper tank 73 and the lower tank 74 in the vehicle width direction. Thus, the projected area in the front-rear direction of the right and left cooling water pipes 83b to 83e and the plurality of fins 84b to 84d, that is, the area where the flow is not blocked by the components on the upstream side of the traveling wind such as the front wheel 12 (see FIG. 3) of the core 75 can be increased, and the cooling performance can be increased by placing the core 75 in the area where the wind flow is faster and by effectively disposing the upper tank 73 and the lower tank 74 in the area behind the front wheel 12 where the wind flow is slower.

Air passes through the space between the adjacent fins 84a to 84d to dissipate heat from the plurality of fins 84a to 84d, thereby cooling the cooling water pipes 83a to 83e, and eventually the cooling water flowing in the cooling water pipes 83a to 83e. The plurality of fins 84a to 84d are disposed, for example, horizontally along the vehicle traveling direction.

An outer circumference surface 83f of the outermost cooling water pipe 83e is supported by support plates 85 having an arc shape with both ends attached to the upper tank 73 and the lower tank 74. Thus, the rigidity of the radiator 47 can be increased.

As described above, by protruding the tank inner circumferential portions 73N and 74N radially inward from the tank outer circumferential portions 73M and 74M, a larger number of cooling water pipes 83a, 83b and 83c can be connected to the tank inner circumferential portions 73N and 74N, thereby increasing the cooling capability.

In the upper tank 73 and the lower tank 74, the respective side faces 73c and 74c may be extended from the side faces 73c1 and 74c1 to form straight lines as indicated by the two-dot chain lines, and both ends of the inner circumference surfaces 73j and 74j may be extended to be connected respectively to the side faces 73c and 74c accordingly. The upper tank 73 and the lower tank 74 have a fan shape surrounded by the right and left side faces 73c and 74c, the outer circumference surfaces 73b and 74b, and the inner circumference surfaces 73j and 74j, respectively, and have a shape protruding radially inward in a tapered shape, so that the shape becomes simple and the cost can be reduced.

Figure 5:
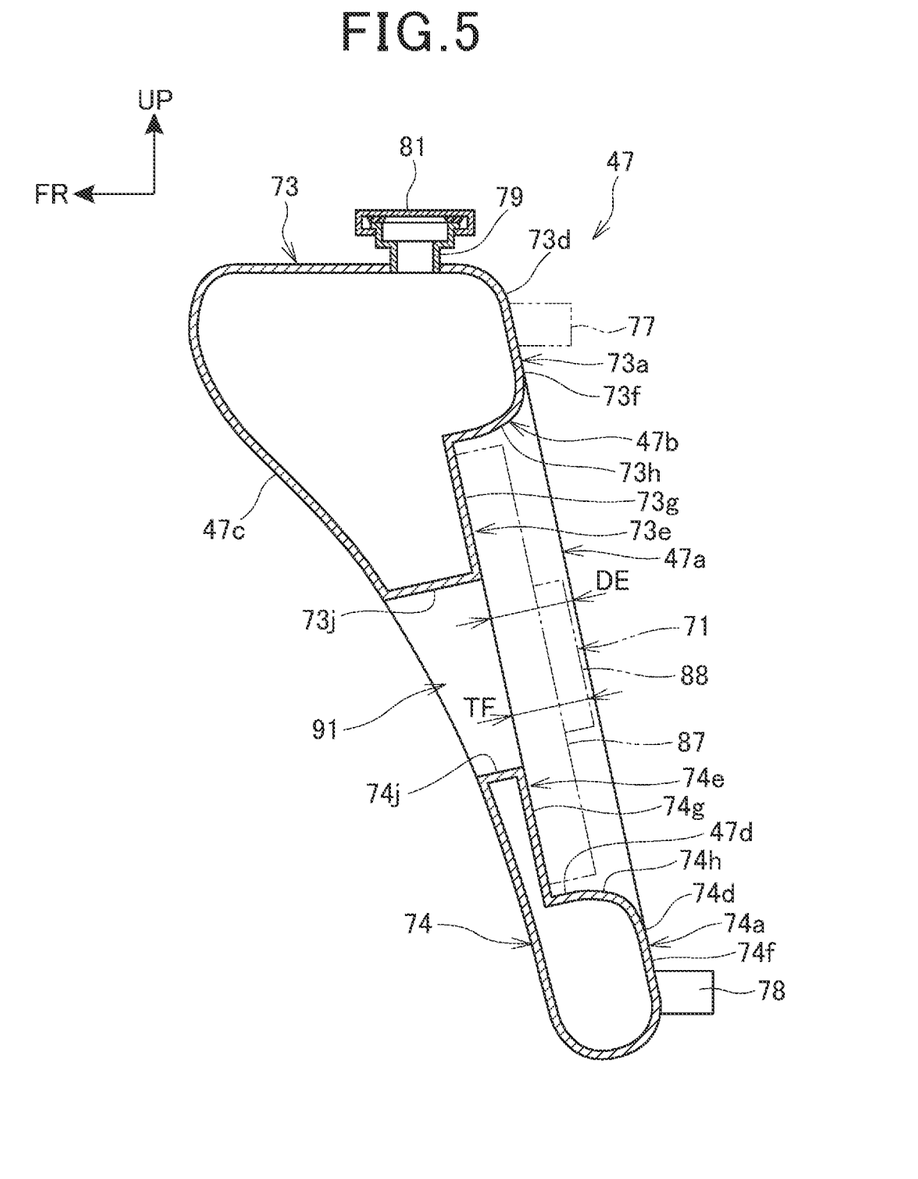
FIG. 5 is a cross-sectional view taken along line V-V of FIG. 4.

FIG. 5 is a cross-sectional view taken along line V-V of FIG. 4.

A rear wall 73d of the upper tank 73 includes an upper recess 73e constituting a part of the recess 47b.

The back surface 73a of the rear wall 73d includes an upper back surface 73f positioned above the upper recess 73e, a bottom surface 73g of the upper recess 73e, and an upper connection surface 73h connecting the bottom surface 73g and the upper back surface 73f of the upper recess 73e. The distance from the upper back surface 73f to the bottom surface 73g in the front-rear direction, that is, the depth of the upper recess 73e is DE.

The cooling fan 71 includes a fan cover 87 and a fan motor 88 fixed to a center portion of the fan cover 87, and a fan (not illustrated) driven by the fan motor 88 is disposed in the fan cover 87. The fan cover 87 is attached to the upper tank 73 and the lower tank 74, to the core 75 (see FIG. 4), or to the upper tank 73, the lower tank 74, and the core 75.

The depth DE of the upper recess 73e described above is larger than thickness TF of the cooling fan 71 (thickness of the fan cover 87+thickness of the fan motor 88).

A rear wall 74d of the lower tank 74 includes a lower recess 74e constituting a part of the recess 47b.

The back surface 74a of the rear wall 74d includes a lower back surface 74f positioned below the lower recess 74e, a bottom surface 74g of the lower recess 74e, and a lower connection surface 74h connecting the bottom surface 74g and the lower back surface 74f of the lower recess 74e. The distance from the lower back surface 74f to the bottom surface 74g in the front-rear direction, that is, the depth of the lower recess 74e is the same depth DE as the depth of the upper recess 73e.

As described above, the cooling fan 71 is disposed in the recess 47b and does not protrude rearward beyond the back surface 47a of the radiator 47.

A space 91 is provided between the inner circumference surface 73j of the upper tank 73 and the inner circumference surface 74j of the lower tank 74, and when the cooling fan 71 is operated, air flow is generated in the space 91, and therefore heat dissipation from the inner circumference surface 73j and the inner circumference surface 74j is promoted, and the upper tank 73 itself and the lower tank 74 itself are cooled.

Figure 6:
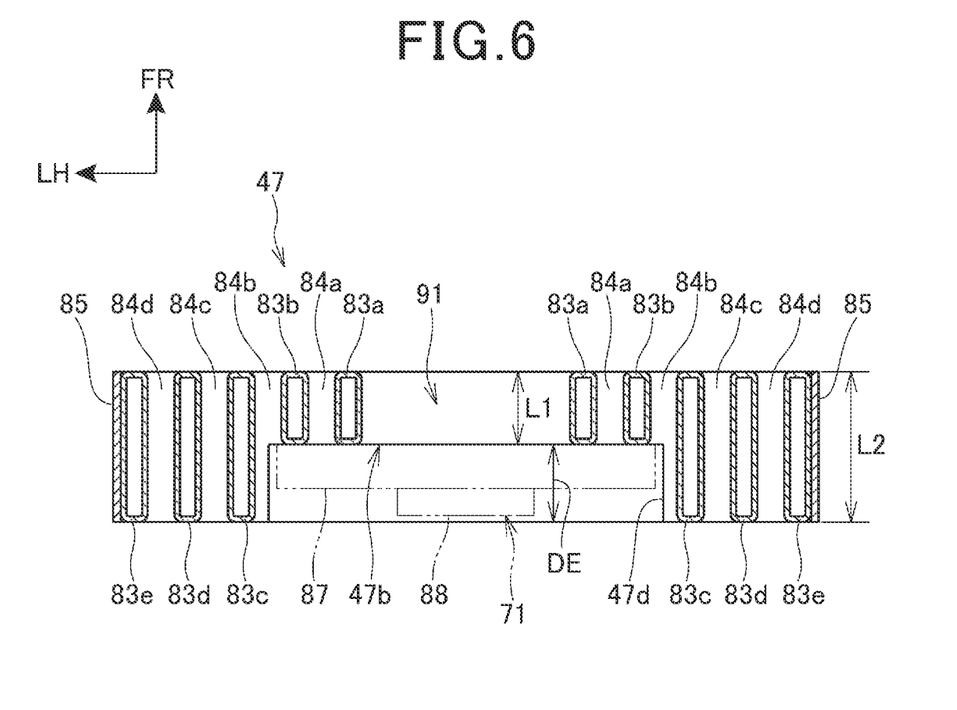
FIG. 6 is a cross-sectional view taken along line VI-VI of FIG. 4.

FIG. 6 is a cross-sectional view taken along line VI-VI of FIG. 4.

The inner circumference surface 47d of the recess 47b of the radiator 47 is disposed between the adjacent cooling water pipes 83b and 83c as viewed from the back. As a result, the front-rear lengths of the cooling water pipes 83a to 83e and the fins 84a to 84d change.

Regarding the cooling water pipes 83a to 83e, the cooling water pipes 83a and 83b are disposed in front of the recess 47b, and the cooling water pipes 83c, 83d and 83e are disposed radially outside of the recess 47b (here, the outside in the vehicle width direction). A front-rear length L1 of the cooling water pipes 83a and 83b is shorter than a front-rear length L2 of the cooling water pipes 83c, 83d and 83e by the depth DE of the recess 47b.

Regarding the fins 84a to 84d, the fin 84a is disposed in front of the recess 47b, the fin 84b is disposed in front of and radially outside of the recess 47b, and the fins 84c and 84d are disposed radially outside of the recess 47b.

The front-rear length of the fin 84a is L1. The fin 84b has a portion in which the front-rear length is L1 and a portion in which the front-rear length is L2. The front-rear length of the fins 84c and 84d is L2.

As described above, by disposing the inner circumference surface 47d of the recess 47b between the cooling water pipes 83b and 83c, it is only necessary to change the shape of the plurality of fins 84b from rectangular, and the man-hour and cost can be reduced as compared with the case where the shapes of the cooling water pipes 83a to 83e are changed.

The radiator 47 described above can be manufactured by a conventional manufacturing method or an additive manufacturing method using a 3D printer or the like.

An example of how to manufacture the radiator 47 by the additive manufacturing method will be described below. (1) First, metal powder (aluminum alloy powder or the like) to be a material of the radiator 47 is spread on a table to be a base in manufacturing to a predetermined layer thickness. (2) The spread layer of metal powder is irradiated with, for example, a laser beam as a heat source to melt and solidify the metal powder. At this time, the irradiation of the laser beam is performed while scanning using two-dimensional data obtained by slicing at every predetermined layer thickness based on three-dimensional CAD data or the like.

(3) Next, the table is lowered by the thickness of one layer, and the metal powder to be the next layer is laid on the first layer to the predetermined layer thickness. (4) Again, a laser beam is emitted to the second layer to melt and solidify the metal powder. (5) The above steps (3) and (4) are repeated. (6) The product which has been melted and solidified by the laser beam in the front layer in the three-dimensional CAD data is taken down from the table.

(7) The metal powder of a portion that has not been irradiated with the laser beam is removed. For example, the metal powder in the hollow portion (in the radiator 47, the inside of the upper tank 73 and the lower tank 74, and the inside of the cooling water pipes 83a to 83e) is discharged through an opening or discharged through a discharge hole formed when the laser beam was emitted. The discharge hole is closed after the metal powder is removed. Thus, the manufacturing of the material of the radiator 47 is completed. (8) The material of the radiator 47 is subjected to surface treatment or the like to complete the radiator 47.

In the case of an additive manufacturing method, the water injection port 79 illustrated in FIG. 5 is integrally molded with the upper tank 73, and the right and left support plates 85 illustrated in FIG. 4 are integrally molded with the right and left cooling water pipes 83e.

Thus, by manufacturing the radiator 47 by the additive manufacturing method, the entire radiator 47 can be integrally formed, and since there is no joint part of each portion unlike the conventional radiator, the number of components can be reduced, and the man-hour and cost of manufacturing can be reduced. Further, even a complicated shape (recess 47b, cooling water pipes 83a to 83e, fins 84a to 84d, and the like) can be easily formed, and the degree of freedom of the shape can be increased. Moreover, since trial manufacture can be easily performed, the cooling capability by the actual radiator 47 can be simulated, and the design of the radiator 47 optimum for a mounting vehicle becomes easy.

In FIGS. 4 and 5, the radiator 47 includes the upper tank 73 and the lower tank 74 for storing cooling water, and the core 75 for connecting the upper tank 73 and the lower tank 74 to each other, the core 75 including the plurality of cooling water pipes 83a to 83e for flowing the cooling water between the upper tank 73 and the lower tank 74, and the plurality of fins 84a to 84d that are extended between the plurality of cooling water pipes 83a to 83e and promote heat dissipation from the cooling water pipes 83a to 83e, in which the recess 47b is provided at least on the back surface 73a which is provided to the core 75 and where air flows.

With this configuration, vehicle components such as the cooling fan 71 can be disposed in the recess 47b, and the radiator 47 and the cooling fan 71 and the like can be disposed in a compact manner.

In FIG. 3, the radiator 47 is disposed behind the front wheel 12 (see FIG. 1) of the motorcycle 10, which is a vehicle, and the upper and lower portions of the radiator have different thicknesses in the front-rear direction of the vehicle.

With this configuration, the radiator 47 can be shaped along a shape of the cowl 52, which is a vehicle body cover provided on the motorcycle 10, and the appearance can be improved and the radiator 47 can be disposed in a compact manner.

In FIG. 4, the core 75 is disposed to extend to outside of the upper tank 73 and the lower tank 74 in a direction perpendicular to the traveling direction of the motorcycle 10 (i.e., in the vehicle width direction).

With this configuration, the area of the core 75 can be increased, and the coolability of the core 75 can be increased.

The upper tank 73 and the lower tank 74 include the tank inner circumferential portions 73N and 74N extending toward the space between the upper tank 73 and the lower tank 74.

With this configuration, the cooling water pipes 83a to 83c can be easily connected to both side faces of the tank inner circumferential portions 73N and 74N.

The cooling water pipes 83a to 83e are formed in an arc shape and connected to the upper tank 73 and the lower tank 74.

With this configuration, the flow of cooling water in the cooling water pipes 83a to 83e can be made smooth. Those disposed on an outer side among the cooling water pipes 83a to 83e having an arc shape can have a longer pipe length, enabling an increase in coolability.

The fins 84a to 84d are provided horizontally along the vehicle traveling direction.

With this configuration, when the radiator 47 is mounted on the motorcycle 10, the air resistance can be reduced.

At least a part of the upper tank 73 and the lower tank 74 is formed in a fan shape.

With this configuration, water can be easily sent from the upper tank 73 and the lower tank 74 to the core 75. The ends of the cooling water pipes 83a to 83e having an arc shape can be easily connected.

The embodiment described above merely indicates an aspect of the present invention, and can be arbitrarily modified and applied without departing from the spirit of the present invention.

For example, in the above embodiment, the upper tank 73 and the lower tank 74 are disposed at the upper portion and the lower portion of the radiator 47, respectively, but the present invention is not limited thereto, and the upper tank 73 and the lower tank 74 may be disposed at a left portion and a right portion of the radiator 47. In this case, the core 75 is disposed to extend to outside of the upper tank 73 and the lower tank 74 in a direction perpendicular to the traveling direction of the motorcycle 10 (i.e., in an up-down direction).

Although the recess 47b is provided on the back surface 47a of the radiator 47, the present invention is not limited thereto, and the recess 47b may be provided on the front surface 47c of the radiator 47. In this case, the cooling fan 71 may be provided in the recess 47b of the front surface 47c. The front surface 47c of the core 75 of the cooling fan 71 becomes a flow surface where air flows into the core 75.

The recess 47b is formed over the upper tank 73, the lower tank 74, and the core 75, but the present invention is not limited thereto, and the recess 47b may be formed only on the core 75.

Although the upper portion of the radiator 47 is formed thicker than the lower portion, the present invention is not limited thereto. The lower portion of the radiator 47 may be formed thicker than the upper portion.

The contours of the upper tank 73 and the lower tank 74 are not limited to a fan shape, but may be other shapes (rectangular, triangular, trapezoidal, convex, circular, semicircular, elliptical, oval or similar shapes) as viewed from the front.

The cooling water pipes 83a to 83e are not limited to an arc shape, but may have other shapes (curved shape, bent shape, meander shape, zig-zag shape, crank shape).

The arrangement of the fins is not limited to the horizontal arrangement, but may be vertical arrangement, arrangement tilted with respect to horizontal, meander arrangement, zig-zag arrangement, or radial arrangement.

The radiator of the present invention is not limited to the application to the motorcycle 10, but can be applied to a saddle riding type vehicle including those other than the motorcycle 10, other vehicles, industrial machines, air conditioners, and various heat exchangers.

REFERENCE SIGNS LIST

10 Motorcycle (vehicle)
12 Front wheel
47 Radiator
47a Back surface (flow surface)
47b Recess
73 Upper tank (first tank)
73N Tank inner circumferential portion (protrusion)
74 Lower tank (second tank)
74N Tank inner circumferential portion (protrusion)
75 Core
83a, 83b, 83c, 83d, 83e Cooling water pipe
84a, 84b, 84c, 84d Fin

What is claimed is:

1. A radiator that is disposed behind a front wheel of a saddle riding vehicle, the radiator comprising:
a first tank and a second tank configured to store cooling water, wherein the first tank is disposed at an upper portion of the radiator and the second tank is disposed at a lower portion of the radiator; and
a core configured to connect the first tank and the second tank to each other, wherein
the core includes a plurality of cooling water pipes configured to flow the cooling water between the first tank and the second tank, and a plurality of fins extending between the plurality of cooling water pipes to promote heat dissipation from the cooling water pipes,
the core further includes a flow surface through which air can flow when the saddle riding vehicle is moving, the flow surface including a recess, and
when viewed from a side view of the saddle riding, vehicle:
a front surface of the radiator is shaped to expand forward along a vehicle body frame of the saddle riding vehicle as the radiator extends upward from the lower portion of the radiator;
a back surface of the radiator tilts forward as the back surface extends vertically in the side view of the saddle riding, vehicle; and
the upper portion of the radiator is formed thicker than the lower portion of the radiator in the front-rear direction of the saddle riding vehicle.

2. The radiator according to claim 1, wherein the core is disposed to extend to the outside of the first tank and the second tank in the vehicle width direction such that an outermost portion of the core is disposed outside outermost portions of the front wheel of the saddle riding vehicle in the vehicle width direction so the air can flow through the plurality of fins when the saddle riding vehicle is moving.

3. The radiator according to claim 1, wherein the first tank and the second tank include protrusions extending toward a space between the first tank and the second tank.

4. The radiator according to claim 1, wherein the cooling water pipes are formed in an arc shape and are connected to the first tank and the second tank.

5. The radiator according to claim 1, wherein at least a part of the first tank and the second tank is formed in a fan shape as viewed from the back of the saddle riding vehicle, the fan shape being a circular sector.

6. A radiator that is disposed behind a front wheel of a saddle riding vehicle, the radiator comprising:
a first tank and a second tank configured to store cooling water, wherein the first tank is disposed at an upper portion of the radiator and the second tank is disposed at a lower portion of the radiator; and
a core connecting the first tank and the second tank to each other, wherein
the core includes a plurality of cooling water pipes configured to flow the cooling water between the first tank and the second tank, and a plurality of fins extending between the plurality of cooling water pipes to promote heat dissipation from the cooling water pipes, and
the core is disposed to extend to the outside of the first tank and the second tank in the vehicle width direction such that an outermost portion of the core is disposed outside outermost portions of the front wheel of the saddle riding vehicle in the vehicle width direction so air can flow through the plurality of fins when the saddle riding vehicle is moving.

7. The radiator according to claim 6, wherein the core further includes a flow surface through which the air can flow when the saddle riding vehicle is moving, the flow surface including a recess.

8. The radiator according to claim 6, wherein the upper portion of the radiator is formed thicker than the lower portion of the radiator in the front-rear direction of the saddle riding vehicle.

9. The radiator according to claim 6, wherein the cooling water pipes are formed in an arc shape and are connected to the first tank and the second tank.

\* \* \* \* \*